(12) United States Patent
Rozenblatt et al.

(10) Patent No.: US 6,226,807 B1
(45) Date of Patent: May 8, 2001

(54) SYSTEM AND METHOD FOR A REDUCED WATER CONSUMPTION VACUUM TOILET

(75) Inventors: Mike M. Rozenblatt, Manhattan Beach; Robert G. Ratliff, Buena Park, both of CA (US)

(73) Assignee: MAG Aerospace Industries, Inc., Compton, CA (US)

( * ) Notice: Subject to any disclaimer, the term of this patent is extended or adjusted under 35 U.S.C. 154(b) by 0 days.

(21) Appl. No.: 09/326,783

(22) Filed: Jun. 4, 1999

(51) Int. Cl.[7] ....................................................... E03D 11/00
(52) U.S. Cl. ......................................... 4/431; 4/313; 4/321
(58) Field of Search ................................. 4/431, 313, 321, 4/330, 406, 408, 250, DIG. 3, 623

(56) References Cited

U.S. PATENT DOCUMENTS

| 3,193,846 | * | 7/1965 | Lefebvre | 4/313 |
| 3,364,502 | * | 1/1968 | Fyans | 4/330 |
| 4,032,822 | * | 6/1977 | Un | 4/DIG. 3 |
| 4,225,986 | | 10/1980 | Mauk . | |
| 4,392,260 | | 7/1983 | Bensen . | |
| 4,443,898 | | 4/1984 | Aguero . | |
| 4,707,867 | | 11/1987 | Kawabe et al. . | |
| 5,271,105 | * | 12/1993 | Tyler | 4/431 |
| 5,625,294 | * | 4/1997 | Kawai et al. | 4/DIG. 3 |
| 5,694,653 | * | 12/1997 | Harlad | 4/623 |
| 5,943,712 | * | 8/1999 | Van Marcke | 4/623 |

FOREIGN PATENT DOCUMENTS

| 3339 896 A1 | 5/1985 | (DE) . |
| 0 453 702 A1 | 10/1991 | (EP) . |
| 1-223231 | 9/1989 | (JP) . |
| 1-299930 | 12/1989 | (JP) . |
| 2-70839 | 3/1990 | (JP) . |

* cited by examiner

*Primary Examiner*—Charles R. Eloshway
(74) *Attorney, Agent, or Firm*—Christie, Parker & Hale, LLP

(57) ABSTRACT

A system and method for reducing water consumption in a vacuum toilet on an aircraft. The system and method includes a weight sensing device that is mounted to an aircraft toilet and is responsive to weight applied to the bowl of the toilet. The weight sensing device detects that a toilet user is seated upon the toilet seat when it measures a weight applied to the toilet bowl. On the other hand, the weight sensing device detects that a toilet user is standing when the weight sensing device does not measure a weight applied to the toilet bowl. A flush control unit is connected to the weight sensing device and controls the amount of water utilized in the flushing of the toilet. When the toilet is flushed and the weight sensing device has detected that a toilet user has sat upon the toilet seat, the flush control unit commands that a standard amount of water be used to remove the solid waste of the toilet user. On the other hand, when the toilet is flushed and the weight sensing device has detected that the toilet user has stood, the flush control unit commands that a small amount of water be used thereby saving water.

17 Claims, 4 Drawing Sheets

SYSTEM AND METHOD FOR A REDUCED WATER CONSUMPTION VACUUM TOILET

FIELD OF THE INVENTION

This invention relates generally to vacuum toilet systems for aircraft, or other modes of transportation, and, in particular, to a system for reducing the amount of water consumed in the flushing of a vacuum toilet system.

BACKGROUND OF THE INVENTION

In the operation of commercial aircraft, it is necessary to provide on-board toilet facilities for use by the passengers and crew. These toilet facilities include vacuum toilets which presently require a specific amount of water to operate. However, an aircraft has only one limited water supply to meet all the water needs of the passengers and crew during the flight of the aircraft for drinking, food preparation, and other uses, as well as for use by the aircraft toilets. The amount of water stored in the aircraft is proportional to the trip duration and the number of passengers and crew that will be on-board the aircraft. Further, an ample amount of water is necessary to ensure the comfort of the passengers and crew. Unfortunately, a large amount of fuel is required just to transport the water supply which is a significant operational cost and decreases the efficiency of the aircraft. Therefore, a need exists to reduce the amount of water required to be flown by the aircraft to increase the overall efficiency of the aircraft and reduce operational costs.

As previously discussed, a significant amount of water is used during any given aircraft flight to operate the aircraft toilets. A reason for this is that when the toilet is flushed, no differentiation is made between flushing with solid matter due to defecation, and without solid matter, such as when a man stands and urinates. When the toilet is flushed, a standard amount of water is always used, approximately 8 fluid ounces, which assumes that solid matter, such as tissues and feces, is present. This large amount of water is necessary, when solid matter is present, because if a lesser amount of water is used, deposits will rapidly build upon the walls of the connecting conduits and critically impair the operation of the toilet system. However, when a male uses the toilet to urinate, substantially less water is required for flushing, and using a standard amount of water is excessive. The applicants estimate that approximately 45% of toilet use is by men standing and urinating resulting in a large amount of wasted water. Thus, aircraft currently carry a large load of unnecessary water, and correspondingly use a significant amount of unnecessary fuel to transport it. Therefore, it would be beneficial to have an aircraft toilet system that can vary the amount of flush water used depending upon whether the user has urinated or defecated.

An apparatus to control the amount of water used in the flushing of a toilet is described in U.S. Pat. No. 4,707,867 to Kawabe et al. The Kawabe apparatus utilizes a light beam sensor to detect whether a person has sat upon a toilet seat and uses this information to determine the volume of flush water to be used. The light beam sensor emits a light beam to a reflector which reflects the light beam back to the sensor creating an unbroken horizontal light beam path. The light beam sensor and reflector are located slightly above the toilet such that the light beam path is correspondingly located at the same position. Hence, when a user occupies the toilet, the light beam can neither reach the reflector nor be reflected back to the sensor, and the sensor thereby detects the presence of a user seated on the toilet. If the light beam is interrupted for greater than 90 seconds, the apparatus assumes the toilet user has defecated and utilizes a large amount of water, otherwise, the apparatus assumes the toilet user has urinated and utilizes a small amount of water. This apparatus uses a complicated electronic circuit having a plurality of different timers, which are used to time the interruption of the light beam and to control the timing of the opening and closing of a flush valve, thereby controlling the amount of water used. Although, this type of apparatus works well for its intended purpose, it has many drawbacks that would make it unsuitable for use in an aircraft toilet system.

A disadvantage of the Kawabe apparatus is that it is not suitable for use with aircraft because the aircraft lavatory system, as well as, the aircraft toilet system, would have to be substantially altered to accommodate it. For example, the light beam sensor would have to be mounted to one wall of the aircraft lavatory and the reflector would have to be mounted to another wall of the aircraft lavatory. Also, this type of light beam sensor is likely to become contaminated over time and require servicing. Furthermore, the use of a light beam sensor requires a complicated and expensive electronic circuit which has a plurality of different timers to time the interruption of the light beam. Lastly, another disadvantage of this apparatus, is that the sensor, the electronic circuit, and the associated wiring, could potentially cause electromagnetic interference with the existing on-board electronics of the aircraft. Therefore, the addition and integration of the Kawabe apparatus to an aircraft lavatory and toilet system could be costly and could potentially require additional testing and retrofitting to verify that it does not interfere with the already existing on-board electronics of the aircraft. Thus, the Kawabe apparatus is just not readily adaptable for use with an aircraft.

Accordingly, it should be appreciated that there is a need for a system for reducing water consumption in a vacuum toilet, suitable for use in an aircraft, that detects whether a toilet user has sat on the toilet seat, or has stood, and uses that information to control either a longer or shorter period of flow of rinse water allowing for a significant reduction in average water consumption.

SUMMARY OF THE INVENTION

The present invention provides a system for reducing the water consumption in a vacuum toilet on an aircraft by detecting whether a toilet user has sat on the toilet seat, or has stood, and uses that information to control either a longer or shorter period of flow of rinse water allowing for a significant reduction in average water consumption while maintaining current standards of toilet system cleanliness.

The system for the reduced water consumption vacuum toilet of the present invention includes a weight sensing device that is mounted to an aircraft toilet and is responsive to a weight applied to the bowl of the toilet. The weight sensing device detects that a toilet user is seated upon the toilet seat when it measures a weight applied to the toilet bowl. On the other hand, the weight sensing device detects that a toilet user is standing when the weight sensing device does not measure a weight applied to the toilet bowl. A flush control unit is connected to the weight sensing device and controls the amount of water utilized in the flushing of the toilet. When the toilet is flushed and the weight sensing device has detected that a toilet user has sat upon the toilet seat, the flush control unit commands that a standard amount of water be used. On the other hand, when the toilet is flushed and the weight sensing device has detected that a toilet user has stood, the flush control unit commands that a small amount of water be used thereby saving water.

In a preferred embodiment, the weight sensing device used is a pressure sensor which responds to the force applied to the toilet bowl by the toilet user sitting upon the toilet seat and generates a pressure signal that is proportional to the amount of force. A pressure derivation circuit is connected to the pressure sensor to receive the pressure signal. Upon receipt of the pressure signal, the pressure derivation circuit compares the pressure signal to a threshold value. The threshold value corresponds to a minimum weight required to be applied to the toilet bowl to indicate that a toilet user has sat upon the toilet seat. The pressure derivation circuit generates a standard flush signal if the pressure signal is greater than the threshold value indicating that a toilet user has sat on the toilet seat and has most probably defecated. Otherwise, the pressure derivation circuit does not generate a signal indicating that the toilet user has not sat upon the toilet seat and has most likely urinated. A flush control unit is connected to the pressure derivation circuit and controls the amount of water utilized in the flushing of the toilet. When the toilet is flushed and the flush control unit has received the standard flush signal, a standard amount of water is used to remove the solid waste of the toilet user. On the other hand, if the toilet is flushed and the flush control unit has not received the standard flush signal, a reduced amount of water is used because the toilet user has most likely urinated.

The use of this system provides an important advantage, in that, by differentiating when a toilet user has either defecated or urinated, and adjusting the amount of water used accordingly, a significant amount of water is saved. The standard amount of water used for defecation in an aircraft toilet is approximately 8 fluid ounces, which is enough to maintain the cleanliness of the toilet bowl and maintain waste system reliability by sufficiently removing deposits from the walls of the connecting conduits of the toilet system. On the other hand, when the toilet is flushed with the reduced amount of water for urination, which is approximately only 3 fluid ounces, this lesser amount of water is still sufficient to clean the toilet bowl and maintain waste system reliability while saving 5 fluid ounces of water. In fact, the applicants predict that about 45% of toilet use on an aircraft is due to men standing and urinating, and that the use of this system can therefore result in an approximate 28% savings in water use by the toilet. Further water savings are accrued because the reduced amount of water will be used when the toilet is flushed prior to use or for simply flushing used tissue, both of which are common occurrences. Thus, by utilizing this system less water is required to be carried by the aircraft and consequently less fuel is needed. This can translate into significant cost savings for the aircraft operator. Furthermore, because less water is needed for a given aircraft flight, more space is available in the aircraft to be utilized for passengers and cargo. Also, because the same amount of water is used when a toilet user defecates, the system still maintains the current standard of toilet system cleanliness and waste system reliability.

In a preferred embodiment, the pressure sensor utilized is a load cell containing a strain gauge device which can be easily mounted to the existing supporting frame of the toilet. To accomplish this, a support structure is mounted to the supporting frame of the toilet, beneath the underside of the toilet bowl, and the load cell is secured to the support structure. The support structure secures the load cell to the supporting frame so that the load cell can measure the deflection of the toilet bowl in response to the force applied to the toilet bowl by a toilet user sitting upon the toilet seat. Advantageously, the support structure is easily installable onto an aircraft toilet without any alteration being required of the surrounding aircraft lavatory. Thus, the installation of the load cell only affects the toilet and no additional retrofitting of the aircraft lavatory or electromagnetic interference testing is required.

Furthermore, upon installation of the load cell to the toilet, the load cell can be manually preset to provide a zero or null response. The structure which accomplishes this presetting feature includes a bracket, an adjustment screw, and a lock nut. The bracket is welded to the underside of the toilet bowl and the adjustment screw is threaded to the bracket so that the position of the adjustment screw can be altered to properly engage the load cell. The adjustable positioning of the adjustment screw permits the application of a desired amount of initial pressure against the load cell so that the load cell can be properly preset upon installation. Further, the lock nut secures the adjustment screw in the desired position, once the load cell has been properly preset, to retain the load cell in the proper preset condition. This procedure compensates for standard component manufacturing and assembly tolerances and eliminates these errors. Once this presetting procedure is finished, it does not need to be repeated unless the toilet is later disassembled.

In a preferred embodiment, when the toilet system is powered-up, the pressure derivation circuit automatically adjusts for errors that could affect the accuracy of the system. These errors can occur due to variations in the circuit components, errors in the mechanical presetting of the load cell described in the previous paragraph, and due to the use of differing lavatory components such as the use of different toilet seats and toilet shrouds, which may change the overall weight applied to the toilet. To automatically adjust for these errors, the pressure derivation circuit automatically generates an adjusted threshold value when the toilet system is powered-up. Upon toilet system power-up, the pressure derivation circuit receives an initial pressure signal from the pressure sensor and stores it as a base pressure value. The pressure derivation circuit then adds this base pressure value to the threshold value creating the new adjusted threshold value. The base pressure value corresponds to the error value for which the system needs to compensate. Thus, when the pressure derivation circuit automatically adds the base pressure value to the threshold value and creates the adjusted threshold value, these errors are eliminated. During operation, the pressure derivation circuit then compares the subsequent pressure signals received to the adjusted threshold value and generates a standard flush signal if the pressure signal is greater than the adjusted threshold value indicating that a toilet user has defecated and a standard amount of rinse water is used. Advantageously, the system self-adjusts for errors so that it remains accurate and requires less servicing and/or replacement over a long period of use.

Other features and advantages of the present invention will become apparent from the following detailed description, taken in conjunction with the accompanying drawings, which illustrate, by way of example, the principles of the invention.

BRIEF DESCRIPTION OF THE DRAWINGS

A system for a reduced water consumption vacuum toilet, constructed according to the preferred embodiment of the invention, is illustrated in the accompanying drawings in which, FIG. 1. is a simplified block diagram illustrating a system in accordance with an exemplary embodiment of the present invention for reducing water consumption in a vacuum toilet on an aircraft.

DETAILED DESCRIPTION OF THE PREFERRED EMBODIMENTS

Figure 1:
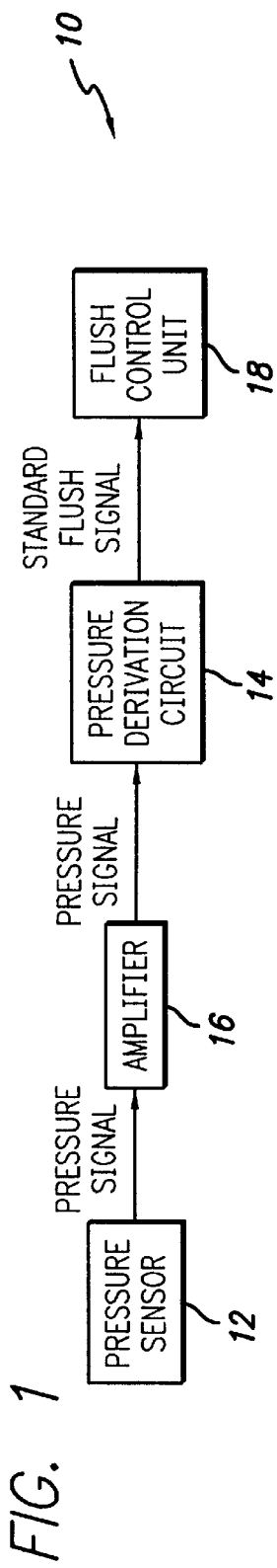

With reference to FIG. 1, a system 10 for reducing the amount of water consumed in the flushing of an aircraft vacuum toilet system, in accordance with a preferred embodiment of the invention, is illustrated in block diagram form. Although the invention will be described for use with an aircraft vacuum toilet system, it should be appreciated that the system of the present invention can be used with any type of toilet system.

As shown in FIG. 1, the system includes a weight sensing device, such as a pressure sensor 12, which can be mounted to an aircraft toilet. The pressure sensor responds to the force applied by a toilet user sitting upon the toilet seat and generates a pressure signal proportional to the amount of force. A pressure derivation circuit 14 is preferably connected through an amplifier 16 to the pressure sensor to receive the pressure signal from the pressure sensor. Upon receipt of the pressure signal, the pressure derivation circuit compares the pressure signal to a threshold value and generates a standard flush signal if the pressure signal is greater than the threshold value thus indicating that the toilet user has sat on the toilet and has defecated. Otherwise, the pressure derivation circuit does not generate a signal therefore indicating that the toilet user has stood and urinated. A flush control unit 18 is connected to the pressure derivation circuit and controls the amount of rinse water utilized in the flushing of the toilet. When the toilet is flushed and the flush control unit has received the standard flush signal, a standard amount of rinse water is used to remove the solid waste of the toilet user. On the other hand, if the toilet is flushed and the flush control unit has not received the standard flush signal, a reduced amount of rinse water is used.

The system 10 provides an important advantage, in that, by differentiating when a toilet user has either defecated or urinated, and adjusting the amount of water used accordingly, it significantly reduces the amount of water required by the toilet system during a typical flight, while maintaining current standards of toilet system cleanliness and waste system reliability. Thus, by utilizing this system, less water is required to be carried by the aircraft and less fuel is needed. This can translate into significant cost savings for the aircraft operator. Also, since less water is needed for a typical aircraft flight, more space is available in the aircraft for passengers and cargo. Additional advantages related to other design features are described below.

Figure 2:
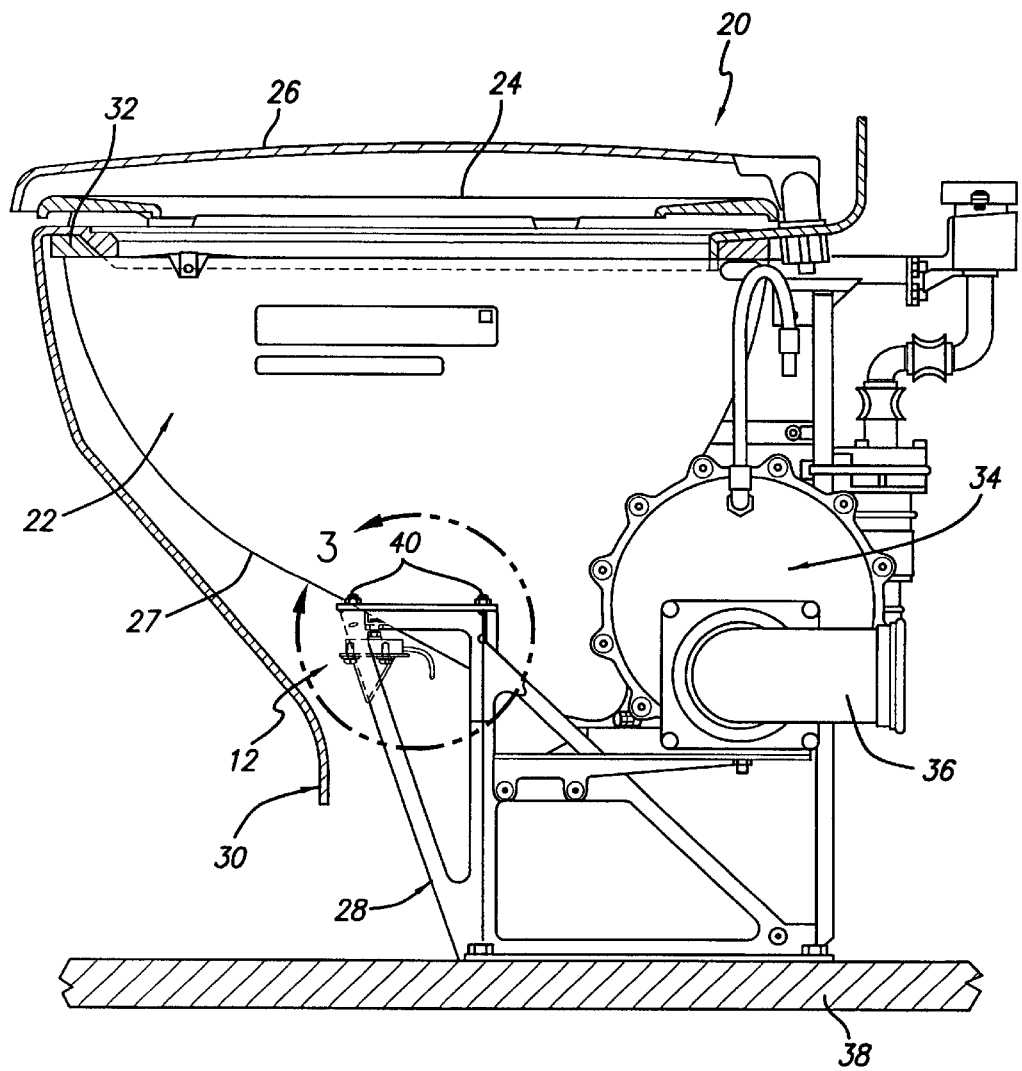
FIG. 2 is a side and partially sectional view of a typical aircraft vacuum toilet system used with commercial aircraft.

With reference to FIG. 2, a typical aircraft vacuum toilet system 20 is illustrated. An aircraft toilet system usually includes a toilet 22 having a toilet seat 24 and a toilet seat cover 26 hinged to a shroud 30, a toilet bowl 27, and a supporting frame 28 for the toilet. Often, aircraft toilets include a shroud which surrounds the toilet system and keeps the internal components of the toilet system hidden from the view of the toilet user. The shroud provides a sanitary enclosure for the toilet system and blends to the contours of the lavatory walls. Also, a semi-compliant pad 32 is mounted between the shroud and the toilet bowl. Mounted behind the toilet bowl is a valve assembly 34, utilized in the flushing of the toilet, and an associated sewer pipe 36 for communicating the waste of the toilet bowl to a waste reservoir (not shown).

The supporting frame 28 mounts the toilet 22 to the bottom floor 38 of the aircraft lavatory. The toilet bowl 27 is directly mounted to the supporting frame by a set of four prime nut and bolt attachments 40 (only two shown). Also, a set of secondary nut and bolt attachments (not shown) are located at the rear of the supporting frame providing extra strength and stability for the toilet in case of severe tip loads. When the toilet seat cover 26 is raised and a toilet user sits down upon the toilet seat 24, the force is transferred through the toilet seat, the shroud 30, and the semi-compliant pad 32 to the toilet bowl and the supporting frame. It should be appreciated, that this is merely an illustration of a typical aircraft toilet system, for exemplary purposes, and does not constitute part of the invention.

Figure 3:
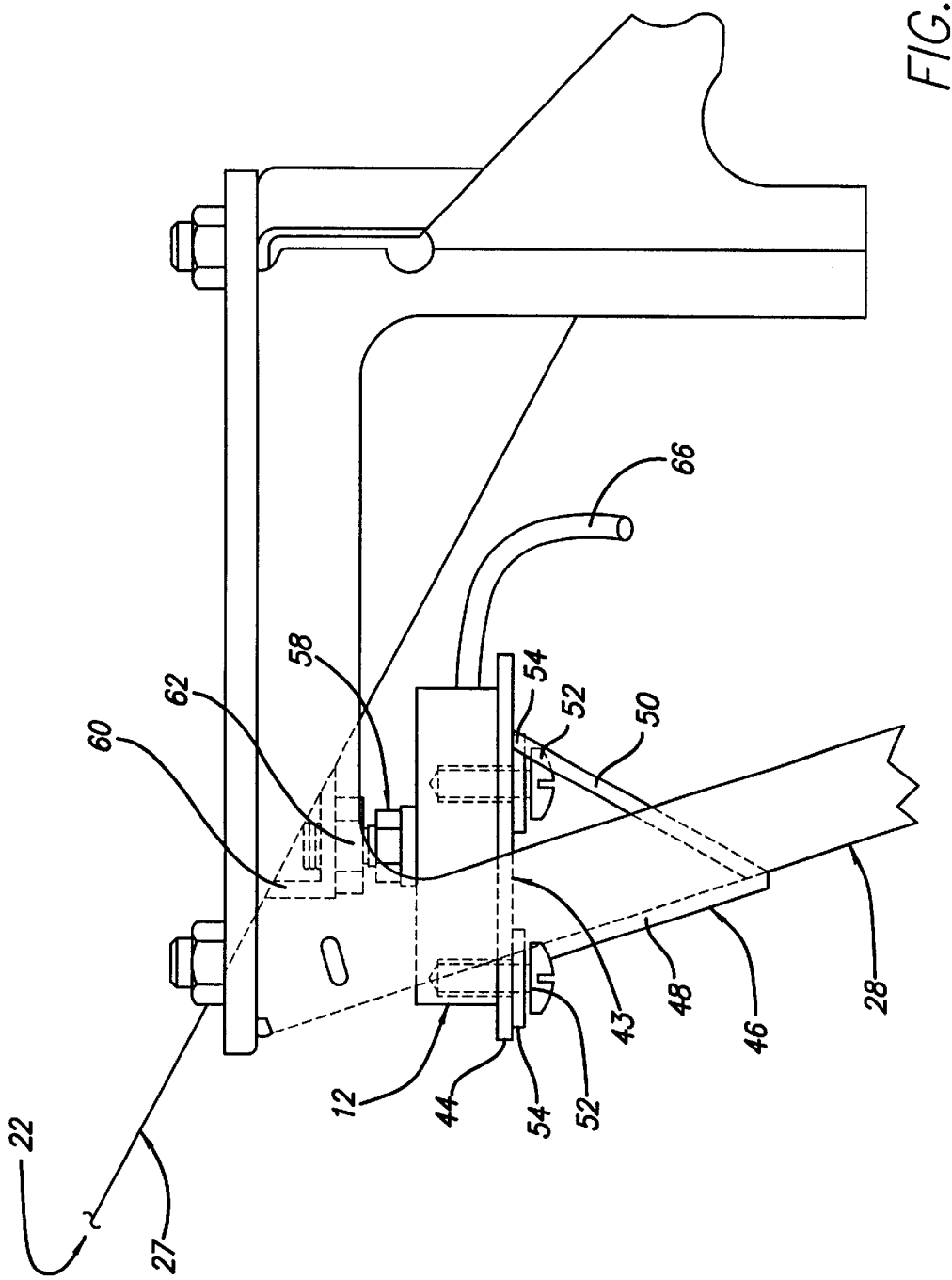
FIG. 3 is an enlarged detailed side view of a load cell mounted by a support structure to the supporting frame of the aircraft vacuum toilet system of FIG. 2.

With reference to FIG. 3, a feature of the invention is that the weight sensing device, such as the pressure sensor 12, can be easily mounted to the existing supporting frame 28 of the toilet 22, to measure the deflection of the toilet bowl 27 in response to a toilet user sitting upon the toilet seat. This is accomplished by mounting a support structure 43 to the supporting frame of the toilet beneath the underside of the toilet bowl. The support structure includes a rectangularly shaped pressure sensor mounting platform 44 and a V-shaped mounting portion 46. The V-shaped mounting portion includes a front leg 48 and a back leg 50 which extend downwardly from the pressure sensor mounting platform. Preferably, the support structure is welded to the supporting frame. The pressure sensor is mounted to the pressure sensor mounting platform of the support structure.

In a preferred embodiment, a button-style load cell, containing a strain gauge device, is utilized as the pressure sensor 12. Three bolts 52 (only two shown) extend through the pressure sensor mounting platform 44 and into the body of the load cell firmly securing it to the support structure 43 and the supporting frame 28. Also, washers 54 may be interposed between the bolts and the mounting platform. Load cells of this type are well-known in the art. Alternatively, a strain gauge device could be directly mounted to the supporting frame. When a toilet user sits upon the toilet seat, the force is directly transferred to the toilet bowl 27 and to the supporting frame with sufficient deflection to stimulate the load cell mounted beneath the toilet bowl, as shown, or a strain gauge device directly mounted to the supporting frame. Advantageously, the support structure and the load cell are easily mountable to an aircraft toilet and no additional retrofitting of the aircraft lavatory is required.

An adjustment screw 58 engages the load cell 12 to transmit the force of the toilet bowl 27 against the load cell and further provides a presetting feature for the load cell. An L-shaped bracket 60 is preferably welded to the underside of the toilet bowl for adjustably mounting the adjustment screw. The adjustment screw is threaded to the bracket so that the position of the adjustment screw can be adjusted, by rotating the adjustment screw, relative to the load cell. The adjustable positioning of the adjustment screw permits the application of a desired amount of pressure against the load cell. Additionally, a lock nut 62 is provided around the adjustment screw to lock the adjustment screw in the desired position.

When the toilet system is first integrated, the load cell 12 can be preset to provide a zero or null response by expanding the adjustment screw 58 against the load cell until the desired response from the load cell is obtained. After the presetting of the load cell is accomplished, the lock nut 62 is tightened to secure the adjustment screw against the load cell and to retain the load cell in the proper preset condition. This procedure advantageously compensates for standard component manufacturing and assembly tolerances and eliminates these errors. Once this presetting procedure is finished, it does not need to be repeated unless the toilet is later disassembled.

Thus, after proper presetting, when a toilet user sits upon the toilet seat the force is transmitted through the toilet bowl 27 to the adjustment screw 58 and against the load cell 12 such that the load cell measures the amount of force applied to toilet seat. The load cell generates a pressure signal proportional to this amount of force and transmits this pressure signal through a shielded wire 66 to the rest of the system 10, illustrated in FIG. 1, which preferably is an electronic circuit that is housed in a control box (not shown) at the side of the toilet. As will be discussed in more detail below, the system 10 determines whether or not a toilet user has sat upon the toilet seat and uses this information to control the delivery of either a standard amount of rinse water or a reduced amount of rinse water to the toilet.

As shown in FIG. 1, which is a block diagram of an electronic circuit for accomplishing this task, the pressure signal is first received by an amplifier 16 which amplifies the pressure signal for receipt by the pressure derivation circuit 14. Upon receipt of the pressure signal, the pressure derivation circuit compares the pressure signal to a threshold value, calculated to be analogous to approximately 31 pounds of weight upon the toilet seat, and generates a standard flush signal for receipt by the flush control unit 18 if the pressure signal is greater than the threshold value. The standard flush signal indicates to the flush control unit that a toilet user has sat on the toilet seat and has defecated and that a standard amount of water should be used. On the other hand, if no pressure signal is received by the pressure derivation circuit, or a pressure signal is received that compares lower than the threshold value, the pressure derivation circuit does not generate a signal. The absence of the standard flush signal indicates to the flush control unit that the toilet user has stood and urinated and that a reduced amount of water should be used.

A feature of the pressure derivation circuit 14 is that, when the toilet system is powered-up, the pressure derivation circuit automatically adjusts for any errors that could affect the accuracy of the system 10. These errors can occur due to variations in the circuit components, such as amplifier offset, errors in the mechanical presetting of the load cell, and due to the use of differing lavatory system components such as the use of different toilet seats and toilet shrouds, which may change the overall weight applied to the toilet. To automatically adjust for these errors, the pressure derivation circuit automatically generates an adjusted threshold value when the toilet system is powered-up.

Figure 4:
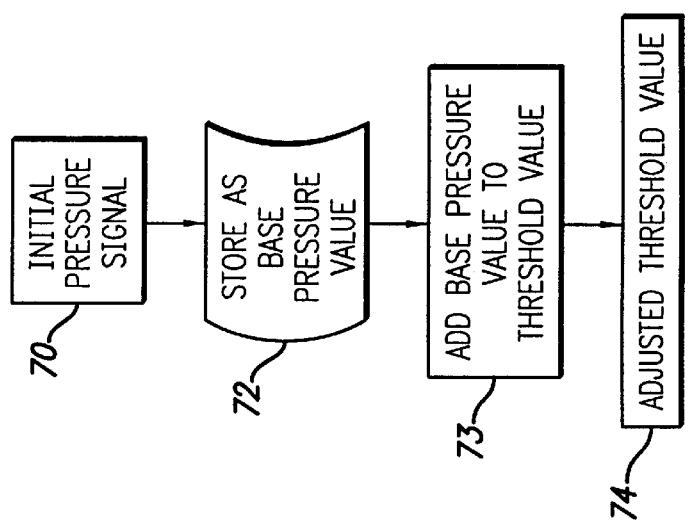
FIG. 4 is a flow chart illustrating how a pressure derivation circuit of the system automatically adjusts for errors upon toilet system power-up.

Referring to FIG. 4, upon toilet system power-up, the pressure derivation circuit 14 receives an initial pressure signal 70 from the pressure sensor 12. The pressure derivation circuit reads the initial pressure signal and stores it as a base pressure value 72. The pressure derivation circuit then adds the base pressure value to the threshold value 73 to create the adjusted threshold value 74. As previously described, the threshold value corresponds to an amount of weight, approximately 31 pounds, applied to the toilet seat, sufficient to determine that a toilet user has sat on the toilet seat. The base pressure value corresponds to any additional weight or errors that the system needs to compensate for. Thus, when the pressure derivation circuit automatically adds the base pressure value to the threshold value and creates the adjusted threshold value, these additional weights and errors are accounted for. During operation, the pressure derivation circuit then compares the subsequent pressure signals received to the adjusted threshold value and generates a standard flush signal if the pressure signal is greater than the adjusted threshold value indicating that a toilet user has defecated and a standard amount of rinse water should be used. Advantageously, the system self-adjusts for internal errors and differing toilet system components so that it remains accurate and requires less servicing and/or replacement over a long period of use.

Referring again to FIG. 1, the flush control unit 18 controls the amount of water utilized in the flushing of the toilet. The flush control unit is connected to the pressure derivation circuit 14 for receipt or non-receipt of the standard flush signal. When the toilet is flushed and the flush control unit has received the standard flush signal from the pressure derivation circuit, indicating that the toilet user has defecated, a standard amount of water is used, approximately eight fluid ounces, to ensure removal of solid waste from the toilet bowl. On the other hand, if the toilet is flushed and the flush control unit has not received the standard flush signal, a reduced amount of water is used, approximately three fluid ounces, since the toilet user has stood and urinated. Because the system detects whether the occupant of a toilet has sat on the toilet seat and uses that information to control either a shorter or longer period of flow of rinse water, this allows for a significant reduction in average water consumption during the flight of the aircraft. Specifically, when the toilet is flushed, and no one has sat on the toilet seat, only three fluid ounces of water is used, which is five fluid ounces less than the standard eight fluid ounces of water used when a toilet user sits on the toilet. Additional water savings are accrued from common compulsions such as flushing prior to use.

Figure 5:
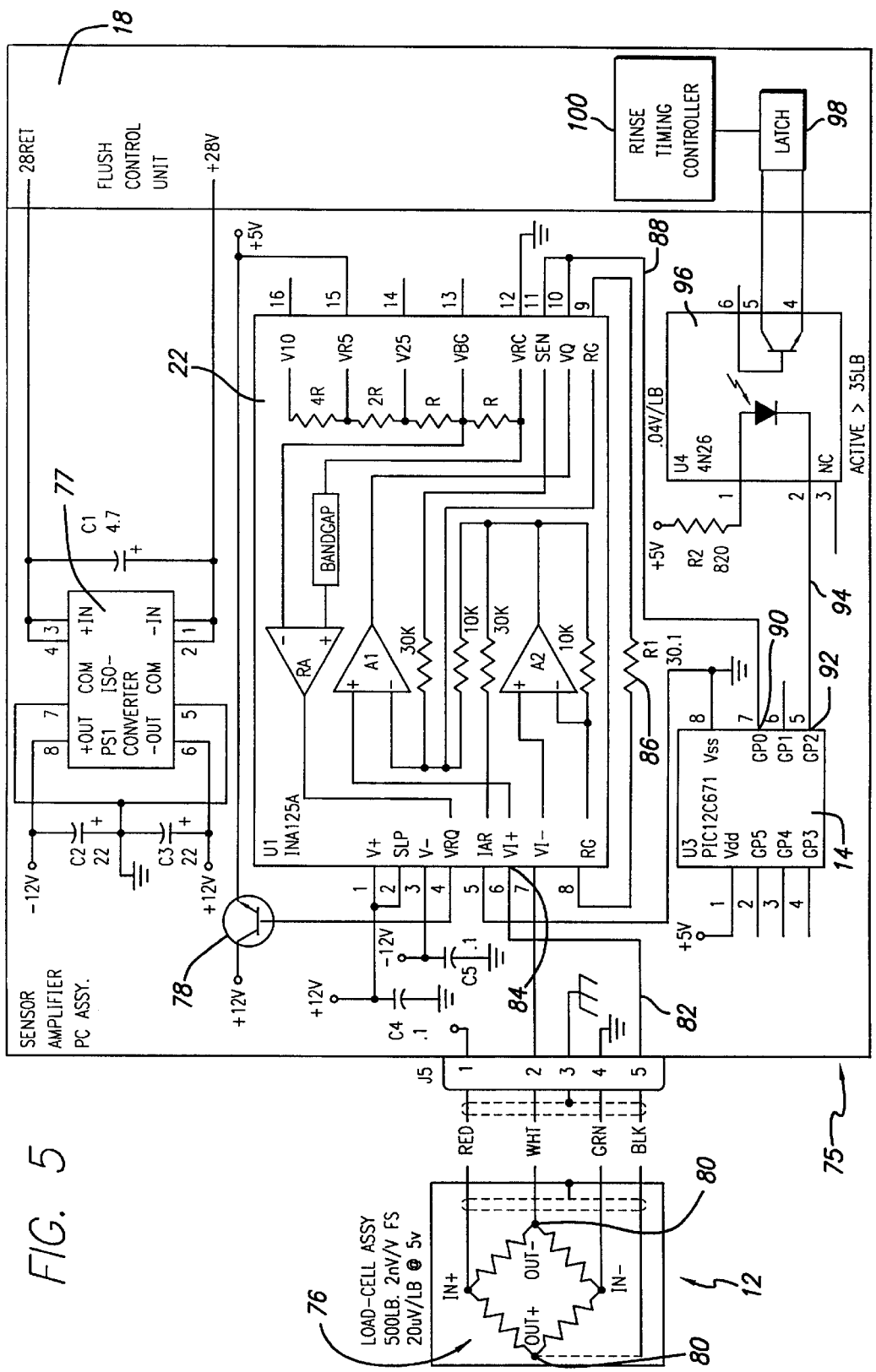
FIG. 5 is an electrical schematic diagram of an exemplary circuit embodiment of the system of FIG. 1.

With reference to FIG. 5, a specific circuit embodiment 75 of the system 10 for the reduced water consumption vacuum toilet of FIG. 1 will now be described. However, it should be appreciated that this specific circuit embodiment is only exemplary, and a multitude of different circuits could be used. The pressure sensor 12 is a button-style load cell which houses a temperature compensated strain gauge device 76. Load cells and the use of load cells are well-known in the art. The particular load cell used in this specific circuit embodiment is a load cell developed by Transducer Techniques, Inc., and is designated as part number LBO-500. This type of load cell is rated as a 500 lb. unit and was selected for its durability and commercial availability. It has a response of 2 mVN full-scale or 20 $\mu$V/lb @ 5 V. Thus, the load cell with a 5 V input produces an output of 20 $\mu$V for every pound of force the load cell is subjected to. It should be noted that the circuit components used in this specific circuit embodiment 75, to be described as follows, are well known in the art and are commercially available.

This specific circuit embodiment 75 is powered by the flush control unit 18 which supplies 28 V of direct current (DC) to a standard isolated DC/DC converter 77. The DC/DC converter, in turn, produces a bi-polar output of +/−12 V direct current to the amplifier 22. The amplifier and the transistor 78 produce a precision 5 V direct current to excite the strain gauge device 76 contained within the load cell 12. When no force is present upon the load cell, the strain gauge is balanced and no difference exists between the positive and negative output nodes 80 of the strain gauge. However, when a toilet user sits upon the toilet seat and the toilet bowl deflects downwards such that the adjustment screw applies a force against the load cell, the resistance of the strain gauge device becomes unbalanced proportional to this applied force and produces a 20 $\mu$V/lb response, the pressure signal, along line 82 to the input pin 84 of the amplifier.

The gain of the amplifier 22 is set by the resistor 86 such that the output of the amplifier, the amplified pressure signal, along line 88, is approximately 0.04 V/lb. The gain of the amplifier is set so that the amplified pressure signal along line 88 will increase approximately 1.25 V when a force of approximately 31 lbs. or more is detected upon the toilet seat. The amplified pressure signal along line 88 is received by the pressure derivation circuit 14 at the input pin 90.

The pressure derivation circuit 14 compares the amplified pressure signal to the adjusted threshold value and activates the output pin 92 of the pressure derivation circuit to generate a standard flush signal along line 94 if the amplified pressure signal is greater than the adjusted threshold value. On the other hand, if the amplified pressure signal compares lower than the adjusted threshold value, the output pin 92 is deactivated and no signal is sent along line 94. As previously discussed, the pressure derivation circuit receives an initial pressure signal when the toilet system is powered-up, and stores the initial pressure signal as a base pressure value. The pressure derivation circuit adds the base pressure value to the threshold value to create an adjusted threshold value. The pressure derivation circuit then compares subsequent pressure signals to the adjusted threshold value and generates a standard flush signal if the subsequent pressure signal is greater than the adjusted threshold value.

The standard flush signal along line 94 is connected to the flush control unit 18 through an optical-isolator 96 which is useful for preventing electromagnetic interference. The flush control unit includes a latch 98 to receive the standard flush signal from the optical-isolator and a rinse timing controller 100 connected to the latch. The rinse timing controller controls the rinse valve which opens and closes to deliver water to the toilet. When the toilet is flushed with the latch in receipt of the standard flush signal from the optical-isolator, a standard rinse duration is used to deliver a standard amount of water to the toilet and the latch is reset at the end of the flush cycle. However, when the toilet is flushed and the latch has not received the standard flush signal from the optical-isolator, the rinse timing controller reduces the amount of water used. Specifically, the rinse timing controller closes the rinse valve more quickly than when standard rinse duration is used so that a reduced amount of water is delivered to the toilet.

The operation of the specific circuit embodiment 75, constructed as described above, proceeds as follows. Referring again to FIGS. 2 and 3, when a toilet user sits upon the toilet seat 24, the toilet bowl 27 deflects downwardly such that the adjustment screw 58 transfers the force against the load cell 12. With reference to FIG. 5, the strain gauge device 76 housed within the load cell 12 becomes unbalanced due to the compression and/or elongation of its resistors and produces a pressure signal proportional to the applied force along line 82 to the input pin 84 of the amplifier 22. The amplifier amplifies the pressure signal creating an amplified pressure signal and applies this amplified pressure signal along line 88 to the input pin 90 of the pressure derivation circuit 14. The pressure derivation circuit then compares this amplified pressure signal to the adjusted threshold value. If the amplified pressure signal is greater than the adjusted threshold value, the output pin 92 is activated and a standard flush signal along line 94 is transmitted through the optical-isolator 96 to the latch 98 of the flush control unit 18. When the toilet is flushed with the latch in receipt of the standard flush signal, a standard amount of water is used and the latch is reset at the end of the flush sequence.

On the other hand, if a toilet user utilizes the toilet without sitting on the toilet seat 24, the toilet bowl 27 does not deflect downwardly and the load cell 12 does not generate a pressure signal. Thus, the pressure derivation circuit 14 does not generate a standard flush signal and the latch 98 of the flush control unit 18 does not receive a standard flush signal. When the toilet is flushed with the latch not in receipt of the standard flush signal, the rinse timing controller 100 reduces the amount of water used.

The use of this system provides an important advantage over standard aircraft toilets, in that, by differentiating when a toilet user has either defecated or urinated, and adjusting the amount of water used accordingly, a significant amount of water is saved. Thus, by utilizing the system of the present invention less water is required to be carried by the aircraft and consequently less fuel is needed. This results in significant cost savings for the aircraft operator. Also, since less water is needed for a given aircraft flight, more space is available in the aircraft to be used for passengers and cargo.

Although the invention has been principally described thus far with reference to its system aspects, the invention embraces a sequence of steps constituting a novel method intended to achieve the described results. Specifically, the method comprises the steps of: mounting the pressure sensor to the toilet such that the pressure sensor is responsive to a force applied to the toilet bowl and generates a pressure signal proportional to the amount of force; comparing the pressure signal to a threshold value utilizing the pressure derivation circuit and generating a standard flush signal if the pressure signal is greater than the threshold value; and controlling the amount of water utilized in the flushing of the toilet with the flush control unit such that when the toilet is flushed and the standard flush signal has been received by the flush control unit, a standard amount of water is used, otherwise, a reduced amount of water is used.

While the invention has been described with reference to its preferred embodiment, it will be appreciated by those skilled in this art that variations may be made without departing from the precise structure or method disclosed herein which, nonetheless, embody the invention defined by the appended claims. For example, although the invention has been described for use with an aircraft vacuum toilet system, it should be appreciated that the system of the present invention can be used with any type of toilet system, such as for use with a toilet system of a train.

We claim:

1. A system for reducing the amount of water consumed in the flushing of a vacuum toilet system in a vehicle, the toilet system including a toilet having a toilet bowl and a supporting frame, the system comprising:

a pressure sensor adapted to be mounted to the toilet and responsive to a force applied to the toilet bowl to generate a pressure signal proportional to the amount of force;

a pressure derivation circuit connected to the pressure sensor to compare the pressure signal to a threshold value and to generate a standard flush signal if the pressure signal is greater than the threshold value; and a flush control unit connected to the pressure derivation circuit to control the amount of water utilized in the flushing of the toilet such that when the toilet is flushed and the flush control unit has received the standard flush signal, a standard amount of water is used, otherwise, a reduced amount of water is used.

2. The system as defined in claim 1, wherein the pressure sensor is a strain gauge device.

3. The system as defined in claim 1, wherein the pressure sensor is a load cell containing a strain gauge device.

4. The system as defined in claim 3, further comprising a support structure adapted to be mounted to the supporting frame of the toilet beneath the underside of the toilet bowl, the support structure securing the load cell to the supporting frame such that the load cell measures the deflection of the toilet bowl in response to an applied force.

5. The system as defined in claim 4, further comprising a bracket adapted to be attached to the underside of the toilet bowl, an adjustment screw mounted to the bracket to adjustably engage the load cell permitting the application of a desired amount of pressure against the load cell to properly preset the load cell upon installation of the load cell to the toilet, and a lock nut to secure the adjustment screw against the load cell to retain the load cell in the proper preset condition.

6. The system as defined in claim 1, further comprising an amplifier connected between the pressure sensor and the pressure derivation circuit.

7. The system as defined in claim 1, wherein the flush control unit includes a latch coupled to the pressure derivation circuit and a rinse timing controller connected to the latch, so that when the toilet is flushed with the latch in receipt of the standard flush signal a standard amount of water is used and the latch is reset at the end of the flush sequence, and when the toilet is flushed with the latch not in receipt of the standard flush signal the rinse timing controller reduces the amount of water used.

8. A system for reducing the amount of water consumed in the flushing of a vacuum toilet system in a vehicle, the toilet system including a toilet having a toilet bowl and a supporting frame, the system comprising:

a load cell containing a strain gauge device responsive to a force applied to the toilet bowl and generating a pressure signal proportional to the amount of force;

a support structure adapted to be mounted to the supporting frame of the toilet beneath the underside of the toilet bowl, the support structure securing the load cell to the supporting frame such that the load cell measures the deflection of the toilet bowl in response to an applied force;

a pressure derivation circuit coupled to the load cell to compare the pressure signal to a threshold value and to generate a standard flush signal if the pressure signal is greater than the threshold value; and a flush control unit connected to the pressure derivation circuit to control the amount of water utilized in the flushing of the toilet such that when the toilet is flushed and the flush control unit has received the standard flush signal, a standard amount of water is used, otherwise, a reduced amount of water is used.

9. The system as defined in claim 8, further comprising an amplifier connected between the load cell and the pressure derivation circuit.

10. The system as defined in claim 8, further comprising a bracket adapted to be attached to the underside of the toilet bowl, an adjustment screw mounted to the bracket to adjustably engage the load cell permitting the application of a desired amount of pressure against the load cell to properly preset the load cell upon installation of the load cell to the toilet, and a lock nut to secure the adjustment screw against the load cell to retain the load cell in the proper preset condition.

11. The system as defined in claim 8, wherein the flush control unit includes a latch coupled to the pressure derivation circuit and a rinse timing controller connected to the latch, so that when the toilet is flushed with the latch in receipt of the standard flush signal a standard amount of water is used and the latch is reset at the end of the flush sequence, and when the toilet is flushed with the latch not in receipt of the standard flush signal the rinse timing controller reduces the amount of water used.

12. A method of reducing the amount of water consumed in the flushing of a vacuum toilet system in a vehicle, the toilet system including a toilet having a toilet bowl and a supporting frame, the method utilizing a pressure derivation circuit connected to a pressure sensor and a flush control unit, the method comprising the steps of:

mounting the pressure sensor to the toilet such that the pressure sensor is responsive to a force applied to the toilet bowl and generates a pressure signal proportional to the amount of force;

comparing the pressure signal to a threshold value utilizing the pressure derivation circuit and generating a standard flush signal if the pressure signal is greater than the threshold value; and controlling the amount of water utilized in the flushing of the toilet with the flush control unit such that when the toilet is flushed and the standard flush signal has been received by the flush control unit, a standard amount of water is used, otherwise, a reduced amount of water is used.

13. The method as defined in claim 12, further comprising the step of mounting a support structure to the supporting frame of the toilet beneath the underside of the toilet bowl, the support structure securing the pressure sensor to the supporting frame such that the pressure sensor measures the deflection of the toilet bowl in response to an applied force.

14. The method as defined in claim 13, further comprising the steps of attaching a bracket to the underside of the toilet bowl, mounting an adjustment screw to the bracket so that the adjustment screw adjustably engages the pressure sensor permitting the application of a desired amount of pressure against the pressure sensor to properly preset the pressure sensor upon installation of the pressure sensor to the toilet, and providing a lock nut to secure the adjustment screw against the pressure sensor to retain the pressure sensor in the proper preset condition.

15. A system for reducing the amount of water consumed in the flushing of a vacuum toilet system in a vehicle, the toilet system including a toilet having a toilet bowl, a supporting frame, and an electrical power system for applying power to enable flushing of the system with water, the toilet system being used by a user who may either stand or seat himself on the toilet, the system comprising:

a pressure sensor adapted to be mounted to the toilet and responsive to a force applied to the toilet bowl to generate a pressure signal proportional to the amount of force, the pressure sensor generating an initial pressure signal when electrical power is first applied to the system, the pressure sensor generating a subsequent pressure signal if the user seats himself on the toilet;

a pressure derivation circuit connected to the pressure sensor, the pressure derivation circuit having a stored threshold value, the pressure derivation circuit performing the following steps:
  a. reading the initial pressure signal received from the pressure sensor,
  b. storing the initial pressure signal as a base pressure value,
  c. adding the base pressure value to the threshold value creating an adjusted threshold value,
  d. comparing subsequent pressure signals to the adjusted threshold value, and
  e. generating a standard flush signal if the subsequent pressure signal is greater than the adjusted threshold value; and a flush control unit connected to the pressure derivation circuit to control the amount of water utilized in the flushing of the toilet such that when the toilet is flushed and the flush control unit has received the standard flush signal, a standard amount of water is used, otherwise, a reduced amount of water is used.

16. A system for reducing the amount of water consumed in the flushing of a vacuum toilet system in a vehicle, the toilet system including a toilet having a toilet bowl, a supporting frame, and an electrical power system for applying power to enable flushing of the system with water, the toilet system being used by a user who may either stand or seat himself on the toilet, the system comprising:

a load cell containing a strain gauge device responsive to a force applied to the toilet bowl and generating a pressure signal proportional to the amount of force, the load cell generating an initial pressure signal when electrical power is first applied to the system, the load cell generating a subsequent pressure signal if the user seats himself on the toilet;

a support structure adapted to be mounted to the supporting frame of the toilet beneath the underside of the toilet bowl, the support structure securing the load cell to the supporting frame such that the load cell measures the deflection of the toilet bowl in response to an applied force;

a pressure derivation circuit coupled to the load cell, the pressure derivation circuit having a stored threshold value, the pressure derivation circuit performing the following steps:
  a. reading the initial pressure signal received from the load cell,
  b. storing the initial pressure signal as a base pressure value,
  c. adding the base pressure value to the threshold value creating an adjusted threshold value,
  d. comparing subsequent pressure signals to the adjusted threshold value, and
  e. generating a standard flush signal if the subsequent pressure signal is greater than the adjusted threshold value; and a flush control unit connected to the pressure derivation circuit to control the amount of water utilized in the flushing of the toilet such that when the toilet is flushed and the flush control unit has received the standard flush signal, a standard amount of water is used, otherwise, a reduced amount of water is used.

17. A method of reducing the amount of water consumed in the flushing of an electrically-powered vacuum toilet system in a vehicle, the toilet system including a toilet having a toilet bowl, a supporting frame, and an electrical power system for applying power to enable flushing of the system with water, the toilet system being used by a user who may either stand or seat himself on the toilet, the method utilizing a pressure derivation circuit, the pressure derivation circuit connected to a pressure sensor and a flush control unit, the pressure derivation circuit having a stored threshold value, the method comprising the steps of:

mounting the pressure sensor to the toilet such that the pressure sensor is responsive to a force applied to the toilet bowl and generates a pressure signal proportional to the amount of force, the pressure sensor generates an initial pressure signal when electrical power is first applied to the system, the pressure sensor generates a subsequent pressure signal if the user seats himself on the toilet;

utilizing the pressure derivation circuit to perform the following steps:
  a. reading the initial pressure signal received from the pressure sensor,
  b. storing the initial pressure signal as a base pressure value,
  c. adding the base pressure value to the threshold value to create an adjusted threshold value,
  d. comparing subsequent pressure signals to the adjusted threshold value, and
  e. generating a standard flush signal if the subsequent pressure signal is greater than the adjusted threshold value; and controlling the amount of water utilized in the flushing of the toilet with the flush control unit such that when the toilet is flushed and the standard flush signal has been received by the flush control unit, a standard amount of water is used, otherwise, a reduced amount of water is used.

* * * * *

UNITED STATES PATENT AND TRADEMARK OFFICE
CERTIFICATE OF CORRECTION

PATENT NO. : 6,226,807 B1
DATED : May 8, 2001
INVENTOR(S) : Mike M. Rozenblatt and Robert G. Ratliff It is certified that error appears in the above-identified patent and that said Letters Patent is hereby corrected as shown below:

<u>Title page,</u>
Item [56], References Cited, U.S. PATENT DOCUMENTS,
Replace "5,694,653 * 12/1997 Harlad...4/623" with -- 5,694,653 * 12/1997 Harald...4/623 --.

Signed and Sealed this

Fourth Day of June, 2002

*Attest:*

*Attesting Officer*

JAMES E. ROGAN
*Director of the United States Patent and Trademark Office*